Oct. 22, 1935.  C. T. MANVILLE  2,017,912
FASTENING DEVICE
Filed April 14, 1934
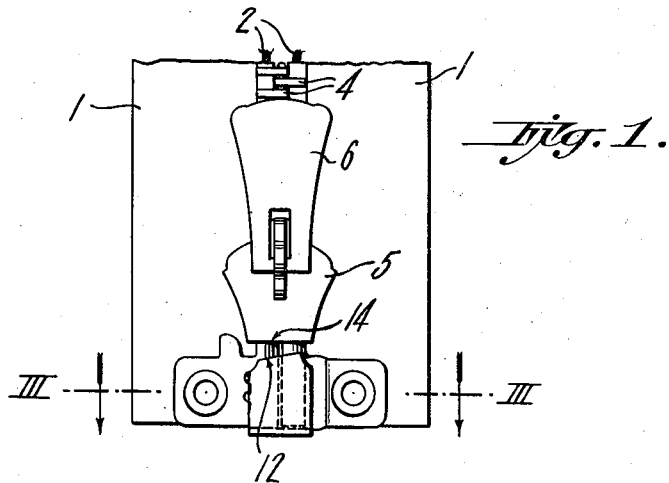
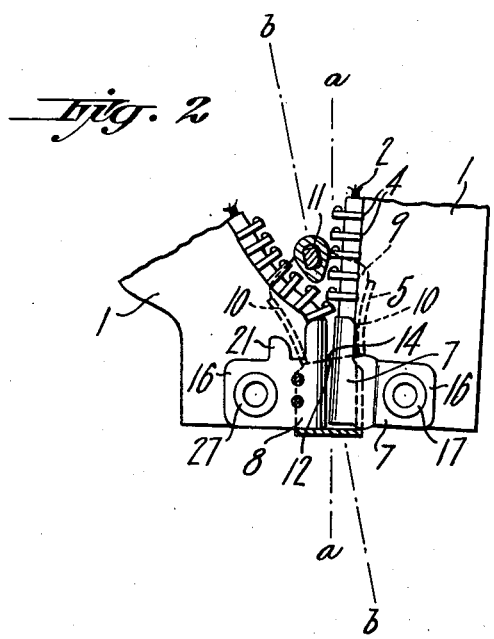
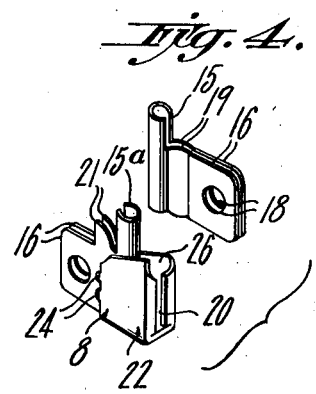
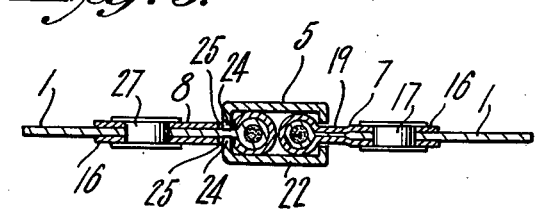
INVENTOR
CHARLES T. MANVILLE
BY
ATTORNEY Patented Oct. 22, 1935

2,017,912

UNITED STATES PATENT OFFICE 2,017,912

FASTENING DEVICE

Charles T. Manville, Woodbury, Conn., assignor, by mesne assignments, to United States Rubber Company, New York, N. Y., a corporation of New Jersey Application April 14, 1934, Serial No. 720,532

1 Claim. (Cl. 24—205)

My invention relates to fastening devices, and more particularly to completely separable slide fastener units.

Completely separable slide fasteners comprise two stringers of flexible material, usually woven tape, to one edge of each of which a row of spaced fastener elements is attached. A slider moves along the edges of the stringers to engage and disengage the fastener elements. At one end of each stringer the fastener elements are replaced by units permitting the connection and/or complete separation of the stringers. One of the units is in the form of a socket or female member which receives a pin or male member carried by the other stringer.

As the channels in the slider through which the fastener elements on the opposing stringers move are divergent upwardly and outwardly of the slider it follows that when the pin or male member is passed through the slider for insertion in the socket or female member the pin normally approaches the fastener elements on the other stringer in angular or divergent relation. In order to insert the pin into the socket through the slider, a considerable distortion of the adjacent material of the stringers has been necessary, and considerable muscular effort has been required to complete the connection. Sometimes adjacent fastening elements have been displaced.

I obviate the foregoing difficulty by providing an engaging surface between the slider and the socket which permits a tilting of the slider relative to the axis of the socket so that the pin may be passed through the slider and into the socket in a direction approaching parallelism to the axis of the socket. Preferably, but not necessarily, the upper face of the socket is cut at an angle to its axis.

The accompanying drawing illustrates a present preferred embodiment of my invention, in which Fig. 1 is an elevational view of a portion of a completely separable fastener unit embodying my invention;

Fig. 2 is a view, partially in elevation and partly in section, showing the relative positions of the slider and socket near the completion of the connecting movement;

Fig. 3 is a sectional view of the united elements taken substantially along the section line III—III of Fig. 1; and Fig. 4 is a perspective view of the co-operating pin and socket elements.

Referring to the drawing, a pair of stringers 1 are provided along their opposing edges with cords 2 for securing fastener elements 4 of any convenient design, as is well understood in the art. A slider 5 having a pull tab 6 is provided for movement along the stringers to engage and disengage the fastener elements 4.

In order to make the stringers 1 completely separable, one of them at its lower edge is provided with a pin or male construction 7 which is insertable into a socket or female member 8 on the other stringer. In inserting the pin 7 into the socket 8 it is necessary to pass it through opening 9 in the slider 5 in order that the slider may move along the fastener elements 4 after the pin and socket are engaged. As the channels formed between the side walls 10 and a connecting stud 11 of the slider diverge outwardly, it follows that the pin 7 tends to enter at an angle to the axis of the slider. If the slider 5 is held in a rigid position against the socket so that its axis remains in parallelism with the axis of the socket, a considerable amount of bending and/or distortion of the stringer material 1 will be necessary in order to insert the pin with a possible misplacement of the fastener elements 4. This has been one of the defects in prior separable fasteners.

By providing a sloping surface 12 on the socket 8, which extends upwardly and outwardly from the supporting stringer, for engaging the lower face 14 of the slider 5 it is possible to tilt the slider in order that the pin 7 may be passed through the slider and into the socket 8 without the difficulties heretofore experienced. In Fig. 2 the line a—a illustrates the position of the edge of the pin element during the inserting movement, while the line b—b represents the axis of the slider 5. The angle a—b represents the amount of tilting of the slider permitted by the engaging surfaces 12 and 14. It is to be understood that the exact shape and location of the surface 12 may be varied within the spirit of the invention, the sloping surface 12 herein illustrated being an illustrative embodiment of the invention and not a limitation thereof.

Referring to Figs. 3 and 4, the pin or male member 7 is formed from a strip of sheet metal which is bent upon itself to form a sleeve 15 around the cord 2 of the stringer and terminates in laterally extending portions 16 which are placed on opposite sides of the stringer 1. A rivet 17 extends through alined openings 18 for holding the laterally extending portions 16 in place. If desired the portions 16 may be pinched together as at 19 immediately behind the sleeve 15 in order to facilitate the passage of the pin between the side walls 10 of the slider and into a slot 20 in the socket 8.

The socket 8 comprises a sleeve 15a and laterally extending portions 16 similar to those of the pin 7 except that ears 21 are provided on the laterally extending portions 16 to form a seat and stop for the slider 5 if the latter is tilted beyond the dotted line position shown in Fig. 2. The ears 21 also serve to hold the fabric between them and the sleeve 15a in a taut condition so that wrinkling of the fabric within the slider 5, when the latter is in its lower position, is avoided. A clip 22 having prongs 24 is passed over the end of the sleeve 15a and the prongs 24 are crimped into openings 25 in the laterally extending portion 16. It is to be understood that the clip 22 may be otherwise formed, if desired. The clip 22 has the slot 20 in alinement with the reduced portion 19 of the pin 7. The upper end 26 of the clip 22 is open for the reception of the pin 7 thereby forming a socket or female member. The socket structure 8 is permanently attached to one of the stringers by a rivet 27.

While I have shown and described the present preferred embodiment of the invention, it is to be understood that it may be otherwise embodied within the spirit thereof and the scope of the appended claim.

Having thus described my invention, what I claim and desire to protect by Letters Patent is:

In a separable fastener assembly, a pair of anchoring stringers having co-operating fastening elements disposed along their edges, a slider for manipulating said elements, said elements on one of said stringers terminating in a metallic sleeve disposed about the edge of the stringer, a socket member carried by the other stringer for receiving the sleeve with its upper edge serving as a stop for said slider, the surface of engagement of said slider and said socket member being inclined upwardly and outwardly from the supporting stringer to permit the slider to tilt relative to the socket member to facilitate the insertion of the sleeve.

CHARLES T. MANVILLE.